United States Patent
Kwan

(10) Patent No.: US 7,487,126 B2
(45) Date of Patent: Feb. 3, 2009

(54) COMPUTER NETWORK METHOD FOR CONDUCTING PAYMENT OVER A NETWORK BY DEBITING AND CREDITING UTILITIES ACCOUNTS

(76) Inventor: Khai Hee Kwan, 6178 Houston Rd, Kingsford, NSW (AU) 2032

( * ) Notice: Subject to any disclaimer, the term of this patent is extended or adjusted under 35 U.S.C. 154(b) by 701 days.

(21) Appl. No.: 09/923,311

(22) Filed: Aug. 7, 2001

(65) Prior Publication Data

US 2002/0147685 A1    Oct. 10, 2002

Related U.S. Application Data

(63) Continuation-in-part of application No. 09/827,788, filed on Apr. 9, 2001, now Pat. No. 7,461,010.

(51) Int. Cl.
G06Q 40/00 (2006.01)
(52) U.S. Cl. .......................... 705/39; 705/35
(58) Field of Classification Search ............ 705/35, 705/39
See application file for complete search history.

(56) References Cited

U.S. PATENT DOCUMENTS

| | | | | |
|---|---|---|---|---|
| 4,689,478 A | * | 8/1987 | Hale et al. | 235/380 |
| 4,860,352 A | * | 8/1989 | Laurance et al. | 380/258 |
| 5,220,501 A | * | 6/1993 | Lawlor et al. | 705/40 |
| 5,991,749 A | * | 11/1999 | Morrill, Jr. | 705/44 |
| 6,185,545 B1 | * | 2/2001 | Resnick et al. | 705/40 |
| 2002/0013767 A1 | * | 1/2002 | Katz | 705/39 |
| 2002/0120696 A1 | * | 8/2002 | Mousseau et al. | 709/206 |

* cited by examiner

*Primary Examiner*—Hani M. Kazimi
*Assistant Examiner*—Olabode Akintola

(57) ABSTRACT

A computer network method for conducting payment over a network by crediting and debiting utility accounts. The computer network includes a computer connected to the Internet, which performs the following functions: (1) receiving a payment request from a prospective payer; (2) confirming the request and verifying payer's identifier and authorization data; (3) receiving an electronic authority from the payer's utility service computer indicating whether or not such request has been approved; (4) crediting and debiting payer's and payee's utility accounts with the approved amount and (5) confirming this transaction by responding a receipt to the payer's mobile device and to payee's server.

20 Claims, 3 Drawing Sheets

COMPUTER NETWORK METHOD FOR CONDUCTING PAYMENT OVER A NETWORK BY DEBITING AND CREDITING UTILITIES ACCOUNTS

CROSS-REFERENCE TO RELATED APPLICATIONS

This invention is continuation in part to U.S. patent application Ser. No. 09/827, 788 filed on 9 Apr. 2001.

STATEMENT REGARDING FEDERAL SPONSORED RESEARCH OR DEVELOPMENT

Not Applicable

REFERENCE TO A MICROFICHE APPENDIX

Not Applicable

FIELD OF THE INVENTION

The present invention relates to methods for making payments for the purchase of goods or services over a network such as the Internet by crediting and debiting utility accounts belonging to the seller and buyer respectively. Utility is defined such as gas, water, electricity or communication data that are essential to most modern home or premises. Utility provider is defined as companies that provide utility services such as a telecommunication provider as in U.S. patent application Ser. No. 09/827,788 filed on Apr. 09, 2001. Each utility company supplying the utility to the consumer will already have a utility account with the customer for billing purposes. Specifically, the invention provides for receiving payments as credits in a utility account including means, at merchant point-of-sale locations such as web site, and includes means for debiting a payer's utility account in response to the payment. Using voice and data network, the user's wireless communication device or fixed line terminal is used as the means to initiate, confirm, authenticate and validating the transaction. A central processor or payment processor is provided to facilitate the process connected to the required utility company's processor.

BACKGROUND OF THE INVENTION

The present invention relates to methods of using a cellular phone or other wireless communication device communicating with a payment processor to initiate, confirm, authorise purchases over the Internet and provide a simple verification of the valid purchase. The purchase cost is debited from the buyer's prepaid account with the utility provider or in the case of non prepaid accounts, accrued as a payable item on their monthly utility statement. This same purchase amount is then credited to the payee's utility account. There is no transfer of funds from any accounts either from a financial institution or otherwise. Merchants receiving payment will have their own utility credits in dollars recorded in their statements and the payer will have the utility debits in dollars recorded for non prepaid accounts to be settled later according to the terms as set by the utility provider. Other terms such as a ceiling of max purchase cost or limit may be set. This invention is primarily designed for small value items.

Prior to the present invention, cellular phones and/or other wireless communication devices have been used in a variety of different procedures involving the transfer of funds between different accounts involving financial institutions and different financial related accounts. These procedures leave something to be desired in that they are unduly complicated and less convenient and/or less secure and costly. Furthermore, some qualification may be required as in a credit card where users must attain certain financial standing to gain access to this facility. In short, this invention is to provide an alternative non-banking solution to making micro payment on the Internet and to increase stakeholders in the e-commerce world by making the process of paying and receiving funds universally available and at a minimum cost.

SUMMARY OF THE INVENTION

The present invention avoids the failings of the prior art by providing methods which are highly reliable and simple to follow using existing technology and infrastructure. The main advantage here is that no funds is physically being transferred from one physical account or another and purchases are either billed by the utility provider or alternatively debited directly if it is a prepaid account. And in both cases they are merely book entries into the accounts with the utility providers such as gas, water, communication or electricity. Money paid will be in the form of credits to the receiver or merchant as the case may be which is either in the form of utility service credits or net direct cash pay out. It is also possible to provide person to person payment however it is important that this facility is only available where the payer's account is a prepaid account. Having it within the utility's accounting system and billing means little or no changes to existing accounting requirements.

In accordance with the present invention, a method is used to purchase goods or services over the Internet and where such purchase is debited into the payer's utility account and the receiver/merchant's account is credited with the amount less a fee. This invention includes confirmation, authorisation and to provide validation of the purchase on presentation. The final step is particularly important for services where the buyer needs to present proof of purchase in order to receive on the spot service purchase such as tickets.

The method of crediting and debiting between different utility accounts with two different utility providers comprising the steps of expanding the function of a utility service provider's central processing unit to include account and authorization information. A separate payment processor linked to participating utility providers is used to generate a function code over the net to the user, requesting user to re-enter the function code provided on the keypad of a cellular phone or other wireless communication device or by voice, sending the function code to the payment processor unit which identifies the desired transaction and the payer and payee. Determining at the payment processing unit whether a personal identification number is needed, and supplying the central processing unit at the payer's utility with the personal identification number where this personal identification number can be keyed in or spoken on the cellular phone. Upon confirmation of the identity of the payer either by the personal identification number or by voice patterns by the central processing unit at the buyer utility company, payment processor will authorize the desired transaction, determining the different accounts involved in the transaction, further instructing a debit entry to the payer's account with the first utility company, instructing a credit entry to payee's account with the second utility company and confirming completion of the transaction with both payer and payee.

Preferably, the method includes the step of initiating a purchase over the Internet by entering the sub-account number as the identifying account to be debited. This step is similar to using credit card but instead of the credit card number, a sub account number is used instead. Upon confirmation of such an account, the service provider will issue an activation code over the net to the user's web browser where such activation code is use to confirm the purchase. The payment processor or utility service provider will initiate a purchase call to the owner of the mobile phone as per the mobile phone number where provided. This step can be substituted by the user calling the utility service provider instead if required. Having connected to the utility provider, the user will enter first the activation code as shown on the web page to confirm the purchase. This code must be spoken directly to the mobile phone where the voice pattern of the user of the mobile phone is compared with the stored voice pattern stored in the sub account or key in on the mobile phone keypad if user has selected this option. This is followed by an authorisation query where the user/purchaser will need to response by entering his or her password that is earlier set on opening the utility sub account. This password can be keyed in or by using the voice protocol as mentioned above. Upon receiving and verifying the authorisation code the service provider will check for available credits in the account in the case of a prepaid account holder. In the case of a non prepaid account holder, the purchase cost will be entered and included as part of the buyer's utility bill invoice to be paid. A credit book entry amounting to the cost of the purchase less a fee will also be made to the payee's utility sub account. A confirmation receipt is then sent to the buyer's mobile phone as a short message service (SMS) where such receipt is encrypted with information about the purchase and purchase identification or other relevant data such as time of purchase as determined by the payment processor. In addition, upon completion of the transaction the merchant's server will receive an encrypted receipt from the payment processor where such receipt is stored as a record for validation if required. For validation purposes, the user will download this stored message to the seller's or merchant's server using an wireless receiving device suitable for this means. Both messages will be compared by the merchant's server.

In case of a dispute, the user or payer can resent this encrypted message to the payment processor to be decrypted and the payment processor will either confirm or deny such message and sent the results to both user and merchant's server.

In another embodiment, the preferred method of crediting and debiting between different utility accounts with two different utility providers comprising the steps of expanding the function of a utility service provider's central processing unit to include a sub account and authorization information. A separate payment processor networked to participating utility providers is used to receive the buyer's sub account and merchant's details that identify the desired transaction and communicating with payer and payee. Determining at the payment processing unit whether a personal identification number is needed, and supplying the central processing unit at the payer's utility company with the personal identification number where this personal identification number can be keyed in at the buyer's terminal or wireless devices. Upon confirmation of the identity of the payer either by the personal identification number or password or voice recognition, the payment processor will authorize the desired transaction, determining the different accounts involved in the transaction, further instructing a debit entry to the payer's account with the first utility company, instructing a credit entry to payee's account with the second utility company and confirming completion of the transaction with both payer and payee.

Preferably, the method includes the step of initiating a purchase over the Internet by entering the account number with a specific utility provider as the identifying account to be debited. This step is similar to using credit card but instead of the credit card number, a sub account number is used instead. This is followed by an authorisation query where the user/purchaser need to response by entering his or her password that is provided on opening the utility purchasing sub account. This password can be keyed in from the buyer's terminal. Upon receiving and verifying the password the utility provider will check for available credits in the account in the case of a prepaid account holder. In the case of a non prepaid account holder, the purchase cost will be recorded and included as part of the user's monthly utility bill invoice ready to be paid. A credit book entry amounting to the cost of the purchase less a fee will also be made to the payee's utility sub account. A confirmation receipt is then sent to the buyer's mobile phone as a short message service (SMS) or to the buyer's email account where such receipt is encrypted with information about the purchase and purchase identification or other relevant data such as time of purchase as determined by the payment processor. In addition, upon completion of the transaction the merchant's server will receive an encrypted receipt from the payment processor where such receipt is stored as a record for validation if required. For validation purposes, the purchaser will download this stored message to the seller's or merchant's server using an wireless receiving device suitable for this means. The merchant's server will compare both messages.

BRIEF DESCRIPTION OF THE DRAWINGS

The foregoing aspects and the attendant advantages of this invention will become more readily appreciated through reference to the following detailed description, when read and considered in conjunction with the accompanying drawings, wherein.

DETAILED DESCRIPTION OF A PREFERRED EMBODIMENT

Figure 1:
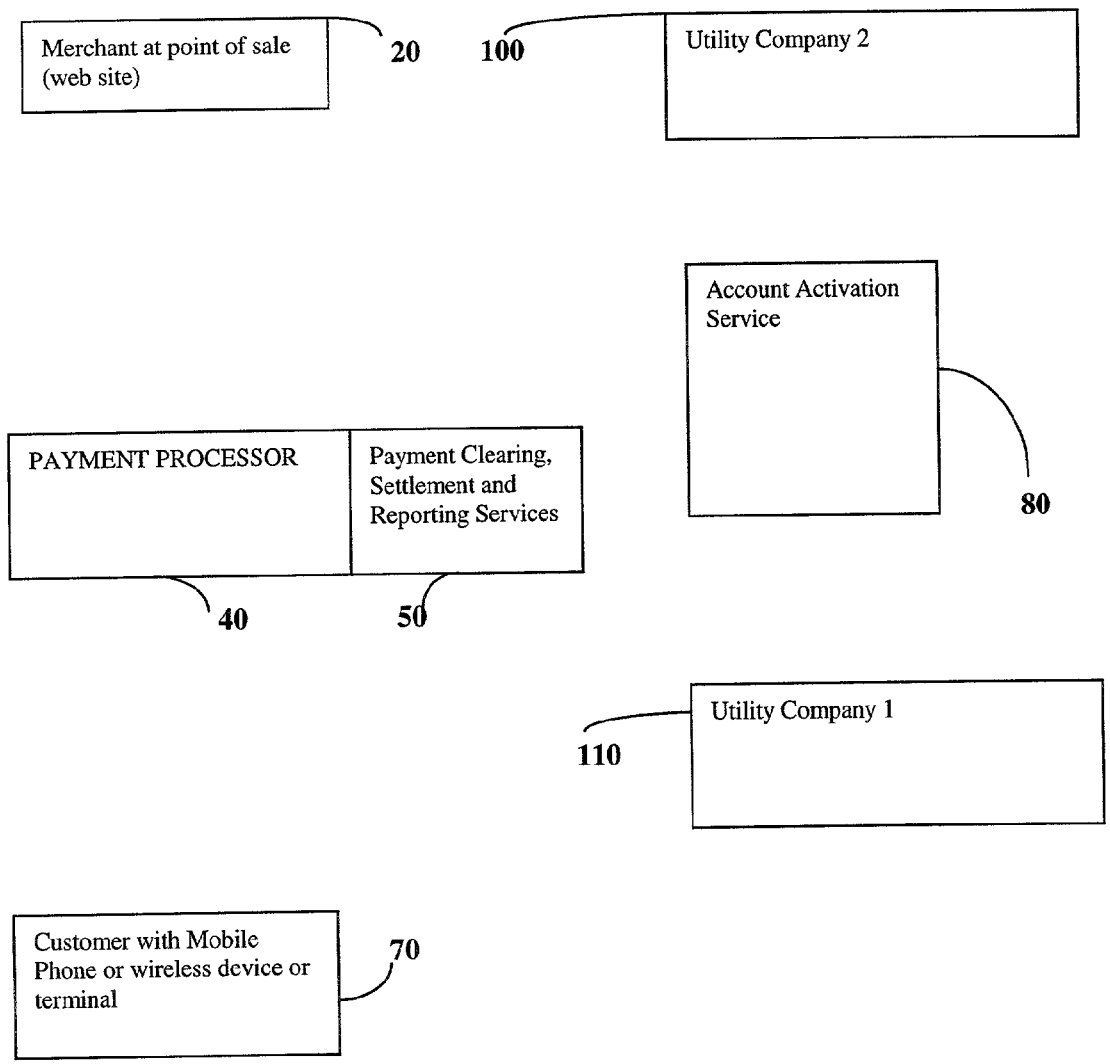
FIG. 1 is a block diagram introducing the various components involved in the system and methods of the present invention.

FIG. 1 illustrates the principle components of a method according to the present invention to provide payment for the purchase of goods and services over the internet by debiting and crediting the payment amount sought in utility providers' accounts from two separate utility company. Referring to FIG. 1, a customer 70 with a mobile phone or wireless device or a terminal connected to the network represents a person who has established one or more payment accounts linked to their utility accounts with at least one provider according to the invention. Customer 70 is illustrated as having a mobile device and visiting at a point-of-sale. A point-of-sale can be a conventional "brick and mortar" retail merchant location, such as a store or restaurant or a vending machine having a link to the Internet through a communication device with display monitor. A point-of-sale for present purposes can also be a kiosk, touch-screen or other data terminal as further described herein at any location accessible to users as long as they are linked to a network. In FIG. 1, for the sake of simplicity, the point of sale is a web site in a web server connected to the Internet.

In FIG. 1, the merchant 20 refers generically to the proprietor of a point-of-sale establishment or payee, such as a web site on the Internet example; www.amazon.com. According to the present invention, as further described later, the customer 70 is connected to this web site by requesting its Universal Resource Locator (URL) over the Internet from a terminal using a program such as known as a browser and intends to pay for a particular item and this intention is transmitted to the payment processor 40 by a hyperlink such as http://www.paymentmaster.com/merchant/ XYZ.asp?merchantid=1234567&ite mid=12342&ran=12342sd, generated by scripts such as CGI or ASP residing on the merchant server 20.

Where "merchantid" represents the id of the merchant, "itemid" represents the item the purchaser wish to purchase and the cost by "ran" which are all encrypted. Other variables may be included depending on the system requirements.

The heart of the present system is a payment processor 40, which can be conveniently implemented on a suitable general purpose digital computer programmed as explained in greater detail later and connected to the network linking the participants. The principle features and functions of the payment processor, each of which will be described in greater detail in turn, include a means for accessing an existing network to communicate transaction data; payment clearing, settlement and reporting services 50 and utility company's processor at 100/110. It is important to note that this payment processor 40 may be coupled with or as part of an extension of at least one utility provider's main central processor rather than as an individual entity as depicted here. The reasons for a separate external entity here is to illustrate the separation of functions, both technically and administratively between the processor at payer's utility account and payment processor. This is crucial for accountability particularly in a payment transaction, which requires a third party to reconcile the accounts.

It is critical to note that in this application, the customer 70 is an individual (or business) who is currently utilizing goods or services provided by at least one utility company and has an account at 110. The user's account for the purposes of making payment from, which we also refer to as the sub account, is maintained by the utility company's computer 110 on a prepaid platform or non prepaid such as an accrual platform where the customer 70 is billed on a periodical basis. The system is intended to serve the needs of multiple merchants (each of which has its own universe of end-users). One important feature of the present system is that the customer 70 must already have an existing account with their respective utility company prior to using this service and the target merchant must agree as the counter party of this service since payment in the form of monetary credits will be accrued into their selected utility accounts which means it is possible to credit a gas account from a electricity account. With this utility account, they will be able to set up a sub account using account activation service 80. The sub account is a "virtual" account separating entries between real utility cost and other transactions as authorised by the payer under terms with the service provider and is consolidated with the main utility account for billing purposes. The utility service provider may provide limits on this sub account. This sub account also contained authorisation data to gain access. It is therefore necessary that payer and payee involved in the transaction to have utility accounts with at least one participating utility company and subsequently open the sub account for receiving or making payment. The payment processor 40 maintains a database of the transactions and respective account holders, each of which is "associated" with a corresponding utility's user account, as further explained below. This is purely for record keeping and for profiling the users. This database does not have any relevant information such as passwords or voice patterns required to authenticate the transaction, which are held with their respective utility company.

Figure 2:
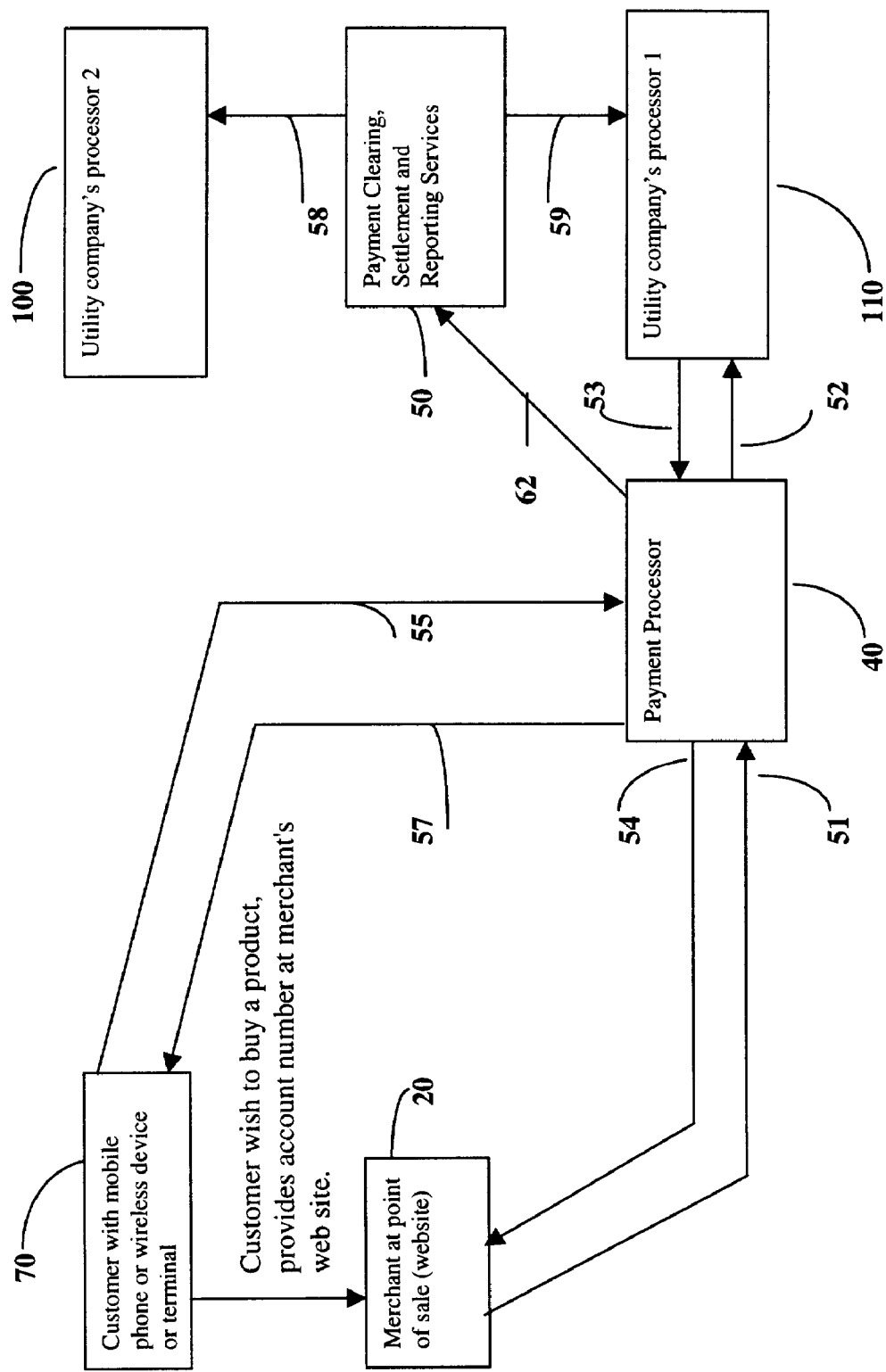
FIG. 2 is a flow chart illustrating a method for processing the payment transaction of a payer account maintained on a prepaid platform, utilizing a payment processor system according to the invention.

FIG. 2 is a flow chart illustrating the basic method for processing a payment transaction to purchase a product from a web merchant where the payer's account is maintained on a prepaid platform with utility company 1 (110). In this example, the web merchant has an account with utility company 2 (100) and both providers are parties to this payment service. To illustrate this further, we have separated the payment processor 40 as an independent hosted server providing the payment services. In a full working system, many payment processors will be required to form local payment network that are linked together to form a larger interconnected system such as the Internet. It is recognised that the payment processor can be integrated with at least one of the utility company's main processor and service as many other utility companies participating in this arrangement. The main reason for this separation is an administrative rather than technical.

We have also applied a prepaid account for customer 70 where such account is held with utility company (110) while the merchant 20 has a non-prepaid account where such account is held with utility company (100). The user (customer 70) visits a merchant at point-of-sale 20 using his browser program from his terminal over the Internet. The customer 70 indicates he wants to make a purchase or make payment at the web site by clicking a hyper link text on the web page residing on the merchant's server over the Internet through connection 51. As mentioned previously, when the payer click on the hyperlink linking to the payment processor via the web site 20, the unique identification of the merchant, cost and other relevant data are communicated through connection 51 to the payment processor 40 where upon the payment processor replies through connection 57 in the form of a web page on its web server to the payer's browser and requesting for payer's utility customer number. For the sake of standardisation, each utility company will have unique identification say for example, Gas Company ABC in USA, state of Texas will have the pre-fix code "gasusatex" followed by 1234567890" where "1234567890" is the customer number. Therefore the payer's utility customer number is "gasusatex1234567890".

The payment processor will initiate the necessary sequence to authenticate the customer 70 as well as to check the merchant's details are valid. It should be appreciated; the initial step to establish contact with the payment processor varies from different point of sale, as we shall see later. On receiving the customer number from the customer 70 through connection 55, payment processor will contact the utility company's database where the customer has provided the account with, in this case utility company (110). Payment Processor 40 will query utility company's processor (110) whether this account exists in their customer database and if it is a prepaid account to also verify if enough funds are current to pay for the goods through connection 52. Payment processor may also query if there is any special limitations to this account where such limitations are pre set by the utility company's main processor 110. If utility company's 110 computer replies with affirmative to both queries through connection 53, Payment Processor 40 will then communicate through connections 57 where the payment processor is required to authenticate the customer 70 as the legitimate account holder before able to process the payment. Payment Processor 40 commenced by either requesting for a password or as the case may be to authenticate the user's voice pattern.

On receiving the authentication data from connection 55, payment processor 40 will interrogate utility company's computer (110) about the account holder and the password provided. These data are kept at the utility company's database at the time the sub account is established using account activation service 80 (not shown in FIG. 2). The main reason for keeping the data with their respective utility company is that each company may have a different accounting system to track their customers' credit or debit status in real time. Only utility companies will have the latest detail of their customers billing in real time. If the data such as the password is keyed in and sent by the customer 70 is verified by utility computer 110 and provided there are sufficient funds for a prepaid user, then utility computer will send a good response to Payment Processor 40 using connection 53. If both password and voice pattern are required, then the customer 70 need to speak the password into the microphone attached to his computer or mobile phone for verification.

Once a good response is received from utility company's computer (110), payment processor 40 will through Payment Clearing, Settlement and Reporting Services 50 instructs utility company's computer (110) to deduct the amount from the customer's prepaid account in real time and at the same time instruct utility company's computer (100) where the merchant's utility sub account is held to credit the account with the same amount deducted from customer's account at utility company's computer (110) less a service fee.

For a payer having an accrual account, the amount owned is accrued as like a real utility charge but maintained separately in a sub account. To explain, this is similar to a provisional account (for bad debts) in accounting terminology where provisions are made 'ready' to be deducted on realisation. One should also realise that account payment schedule differs from utility companies and for each of their customers, hence what is due on a particular date for one customer may not be due for another even within the same utility company. For a prepaid account the debit in the sub account is realised straightaway.

This credit connection 58 and debit connection 59 are performed by Payment Clearing, Settlement and Reporting Services 50 through connection 62 and controlled by Payment Processor 40.

On completion as confirmed by 50, Payment Processor 40 confirms again by sending an electronic receipt to Merchant 20 using connection 54 and to customer 70 using connection 57 in the form of a short message text or email depending on the customer's preferences. On receiving this receipt, Merchant 20 is obligated to release the goods or services as ordered by the customer 70 in order to conclude this purchase transaction.

On completion as confirmed by utility companies 100/110 and earlier by Payment Clearing, Settlement and Reporting Services 50, Payment Processor 40 will record this transaction as settled in its database.

Where the response from payer's utility company processor is bad such that the password is not verified or insufficient funds, payment processor 40 will sent a negative message to the merchant 20, customer 70 and terminated the connections. All messages sent are encrypted.

Figure 3:
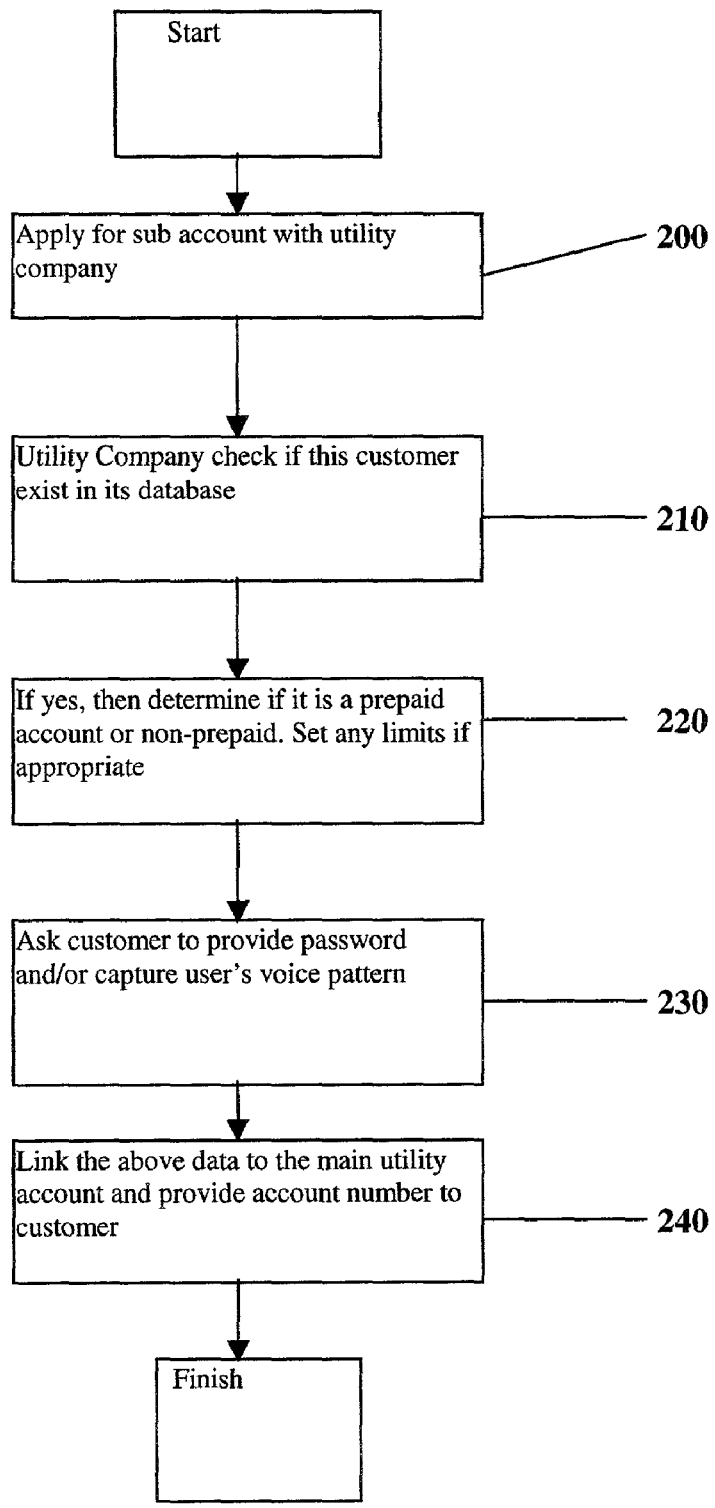
FIG. 3 is a flow chart illustrating a method for activating a sub account with a utility company.

FIG. 3 is a flow chart illustrating methods for establishing the sub account with the utility company. This application is required in order to activate the customer 70 's sub account with the utility company by associating this account to their main utility account. In this invention, we have coupled service 80 with various utility companies' main processor.

To begin, the customer need to have an existing utility account and contacts the Account activation service 80 at their respective utility company which can be implemented on the utility company's (100 & 110) systems or on another platform such as the payment processor 40 so long that it can communicate with the utility company's processor or system. This account activation service 80 can be implemented using interactive voice response technology, which is commercially available. On receiving a request from a customer usually by a mobile phone connection 200, the account activation service 80 communicates with the utility company's main database to confirm 210 that the main utility account is valid and in good standing 220. User is informed based on previous billing history whether this account is a prepaid account or non prepaid and if any pre-set spending is set. This is followed by requiring the user to provide a password or/and a voice pattern by speaking a number of words 230. This are recorded and confirmed by 80 and a sub account is created within the utility's database system associating the password and voice pattern 240. Similarly for the Merchant 20 if they want to use their utility accounts, they must go through the same process as the customer 70 above.

Below is a description of each of the transaction types and the payment processing that is associated with them, Account crediting. Account crediting is a transaction which provides a credit entry amounting to the payment value in the payee's sub account as recorded at the customer database with their respective utility company less a fee. Upon receipt of an account crediting transaction, the payment clearing, settlement and reporting services 50 performs a series of verifications to determine if the transaction is valid. These verifications can include, for example, authentication of payment transaction, ensure that a corresponding account debit has been recorded, identification of the payment account with the target utility company, assessing transactional velocity and limits, validation of merchant, and detection of duplicate transactions.

If the transaction passes the validation checks then the payment clearing, settlement and reporting services 50 prepares the transaction for remote processing at the payee's utility company processor. The payment processor 40 identifies and verifies the payee, the payee's utility company, and the sub account number based on the payment transaction number and receives a confirmation from payment clearing, settlement and reporting services 50 when this transaction is passed to the utility company.

Account debiting. Account debiting is a transaction, which provides a debit entry of the payment value in the payer's sub account at the customer database with the payer's utility company less a fee. Upon receipt of an account debiting transaction, the payment clearing, settlement and reporting services 50 performs a series of verifications to determine if the transaction is valid.

Payment Clearing, settlement and Reporting Services 50 upon instruction from payment processor 40 prepares the transaction for remote processing at the payer's utility company processor and records this transaction as completed. The payment processor 40 identifies the payer, the payer's utility company, and the sub account number, mobile phone number and subsequently created payment transaction number. At completion of both Account Debit and Credit with confirmation from Payment Clearing, settlement and Reporting Services 50, Payment Processor 40 will return a receipt to merchant 20 and payer 70.

Communications

Referring again to FIG. 2, the connection between the payment system (processor 40) and the merchant (point of sale) 20, utility company (100, 110), Customer 70 can be a Frame Relay network or some other secure link, in a presently preferred embodiment, although various communications hardware and protocols can be used. The communications protocol over which the transaction message will be transmitted to and from the payment system to all parties can be, for example VOIP, TCP/IP or WAP.

Processing the Transaction at the Utility Company.

Each transaction type is processed in a different way. Once the transaction type is identified, the processing that is likely to occur is described below.

1. Account Validation. Lookup the customer's account based on the customer account number. Log the transaction. Respond to the payment processor.
2. Account Authentication. Lookup the user's previously stored password or voice pattern and matched it against the data sent by customer. Perform validation checks such as credit limitation, prepaid account amount etc. Log the transaction. Respond to payment processor.
3. Account Debiting. Upon receiving instruction from Payment Clearing, Settlement and Reporting Services 50, lookup the user's account and add payment to non-prepaid account or deduct amount from a prepaid account. Log the transaction. Respond to payment processor.
4. Account crediting. Upon receiving instruction from Payment Clearing, Settlement and Reporting Services 50, lookup the payee's account and add amount paid by payer as credit entry in the sub account. Log the transaction. Respond to payment processor.

Settlement and Clearing

In Payment, Clearing, Settlement and Reporting Services 50, upon receiving payment transaction instruction from payment processor 40, means to contact the respective utility company's main processor to provide payment details directly. On receiving conformation from the respective utility companies' processors directly to payment processor, the payment transaction is logged in the payment processor 40 database. It is important to note that each transaction sent to Payment, Clearing, Settlement and Reporting Services 50 must be matched with a corresponding confirmation from the utility companies' processors to be considered settled otherwise it is known as "clear" but not "settled" in this invention. The risk that the payer will not settle in the ordinary sense with the utility service provider is not a concern of this method. At the end of the processing day, the payment processor aggregates all of the payment transactions for the day based on merchant and customers into the database. The payment processor system performs various accounting functions.

Reporting Functions

A payment reporting services provide daily activities summaries to its customer, utility companies and merchant, and can also provide periodic activity and financial summaries for a fee. Each utility company's processor will then reconcile with this statement. Users can individually access the Payment Processor's reporting services or connected to their respective utility company over its web server using their browser program to log in to check their account details. Users need to register for this service.

Marketing and Profiling

Given the amount of data collected by the payment processor about the users, a marketing and profiling system exists to analyse the purchasing patterns of the users and provide the results to marketing companies for a fee. Users may wish to be excluded from being a statistics by paying an opt out fee.

It should be apparent to one of skill in the art that the method of the present invention can be used for other payment requirements by crediting utility accounts of parties to the transactions for small items that may be too expensive for financial institutions to manage.

While the present invention has been described above in terms of specific embodiments, it is to be understood that the invention is not limited to the disclosed embodiments. On the contrary, the present invention is intended for various modifications and equivalent structures included within the spirit and scope of the appended claims.

I claim:

1. A computer method for conducting fund transfer over at least one network by crediting and debiting utility accounts comprising the steps:

providing utility accounts linked to account identifiers maintained by at least one utility provider and said provider is connected by a network to a payment processor having memory for executing a computer program causing said processor to perform when executed by said processor, the method comprising:

receiving a request for payment from an identifiable payer for an identifiable payee;

confirming said request;

if said request is approved, crediting a payee's utility account and debiting a payer utility account respectively with a payment amount; and whereby said utility accounts are selected from a group consisting of water, electricity, gas, telecommunication and data services accounts and said payment amount is transferable between different and same accounts within said group.

2. A method according to claim 1 wherein the payment amount is in the form of monetary units or utility units and both said units are exchangeable between different accounts within said group.

3. A method according to claim 1 wherein said utility accounts includes netting the amount received against actual utility charges.

4. A method according to claim 1 wherein said request is a function code and said payment processor identifies a transaction and payee from the code.

5. A method according to claim 1 whereby the payer's and payee's utility accounts includes sub-accounts linked to said utility accounts respectively by account identifier.

6. A method according to claim 1 further includes the step of extending at least one utility provider's main processor for establishing sub-accounts for payer and payee.

7. A method according to claim 1 whereby said crediting and debiting of said accounts maintained at said providers are remotely controlled by said processor independently of said providers.

8. A computer system for conducting payment over a network by crediting and debiting utility accounts comprising:

a payment processor;

utility accounts having account identifiers maintained by at least one utility provider having memory and processor and said provider is connected by a network to said payment processor having memory for executing a computer program causing said processor to perform when executed by said processor the method comprising:

receiving a request for payment from an identifiable payer for an identifiable payee;

confirming said request;

if said request is approved, crediting a payee's utility account and debiting a payer's utility account respectively with a payment amount; and whereby said utility accounts are selected from a group consisting of one of the water, electricity, gas, telecommunication and data services accounts and said payment amount is transferable between different and same accounts within said group.

9. A computer system according to claim 8 wherein the payment amount is in the form of monetary units or utility units and both said units exchangeable between different accounts within said group.

10. A computer system according to claim 8 wherein said utility provider's memory is for executing a computer program causing said provider to net the amount received against actual utility charges.

11. A computer system according to claim 8, wherein said request is a function code and said payment processor identifies a transaction and payee from the code.

12. A computer system according to claim 8 whereby the payer's and payee's utility accounts includes sub-accounts linked to said utility accounts respectively by account identifier.

13. A computer system according to claim 8 wherein said utility provider's memory is for executing a computer program causing a step of extending at least one said utility provider's main processor for establishing sub-accounts for payer and payee.

14. A computer system according to claim 8 whereby said crediting and debiting of said accounts maintained at said providers are remotely controlled by said processor independently of said providers.

15. A computer readable storage medium storing instructions that when executed by a computer to perform a method for fund transfer over at least one network by crediting and debiting utility accounts, the method comprising:

receiving a request for payment from an identifiable payer for an identifiable payee;

confirming said request;

if said request is approved, crediting a payee's utility account and debiting a payer's utility account respectively with a payment amount;

whereby said utility accounts are selected from a group consisting of water, electricity, gas, telecommunication and data services accounts and said payment amount is transferable between different and same accounts within said group; and whereby said computer is a payment processor connected to a network to at least one utility provider maintaining utility accounts having account identifiers.

16. A computer readable storage medium storing instructions according to claim of 15, wherein the payment amount is in the form of monetary units or utility units and both said units are exchangeable between different accounts within said group.

17. A computer readable storage medium storing instructions according to claim 15 wherein said instructions includes causing utility account to net the amount received against actual utility charges.

18. A computer readable storage medium storing instructions according to claim 15 wherein said request is function code and said payment processor identifies a transaction and payee from the code.

19. A computer readable storage medium storing instructions according to claim 15 whereby the payer's and payee's utility accounts includes sub-accounts linked to said utility accounts respectively by account identifier.

20. A computer readable storage medium storing instructions according to claim 15 whereby said crediting and debiting of said accounts maintained at said providers are remotely controlled by said processor independently of said providers.

* * * * *

UNITED STATES PATENT AND TRADEMARK OFFICE
CERTIFICATE OF CORRECTION

| | | |
|---|---|---|
| PATENT NO. | : 7,487,126 B2 | Page 1 of 1 |
| APPLICATION NO. | : 09/923311 | |
| DATED | : February 3, 2009 | |
| INVENTOR(S) | : Khai Hee Kwan | |

It is certified that error appears in the above-identified patent and that said Letters Patent is hereby corrected as shown below:

Col. 10

In CLAIM 1, please insert the text -- 's -- after the word payer in column 10 line 31 so that the corrected word as filed is "..payer's..".

Signed and Sealed this
Twenty-fifth Day of October, 2011

David J. Kappos
*Director of the United States Patent and Trademark Office*